United States Patent [19]

Robishaw

[11] 3,805,721

[45] Apr. 23, 1974

[54] FLOAT CONNECTION APPARATUS

[75] Inventor: Alces P. Robishaw, Houston, Tex.

[73] Assignee: Robishaw Engineering, Inc., Houston

[22] Filed: June 26, 1972

[21] Appl. No.: 266,140

[52] U.S. Cl............................. 114/0.5 F, 114/77 R
[51] Int. Cl............................................ B63b 35/00
[58] Field of Search ............ 114/0.5 F, 77 R, 77 A, 114/235 R, 28, 30, 26, 46, 45; 115/6; 9/2 R, 2 S; 61/46.5; 52/593, 271, 578

[56] References Cited
UNITED STATES PATENTS

| | | | |
|---|---|---|---|
| 2,257,001 | 9/1941 | Davis | 52/593 |
| 2,876,726 | 3/1959 | Robishaw | 114/0.5 F |
| 3,057,315 | 10/1962 | Robishaw | 114/26 |

Primary Examiner—Duane A. Reger
Assistant Examiner—D. C. Butler
Attorney, Agent, or Firm—Ralph R. Browning; C. James Bushman

[57] ABSTRACT

Apparatus for releasably connecting a pair of floats comprising: a socket assembly carried by one of the floats and including at least one aperture having rectangular cross-sections; a pin assembly carried by the other float and including a pin member having rectangular cross-sections similar to the cross-sections of the socket aperture and telescopically engageable therewith in a close surrounding fit; and a locking assembly movable from a first position, permitting free movement of the pin member into and out of the aperture, to a second position locking the pin member in the close surrounding fit with the aperture. The walls of the socket aperture may be longitudinally tapered inwardly and the external longitudinal surfaces of the pin member may be correspondingly tapered to provide a tapered fit therebetween. The pin member may be provided with a pair of transversely disposed locking grooves on opposite sides thereof and the locking assembly may include a wedge member engageable with the pair of locking grooves in the second position to lock the pin within the aperture.

21 Claims, 16 Drawing Figures

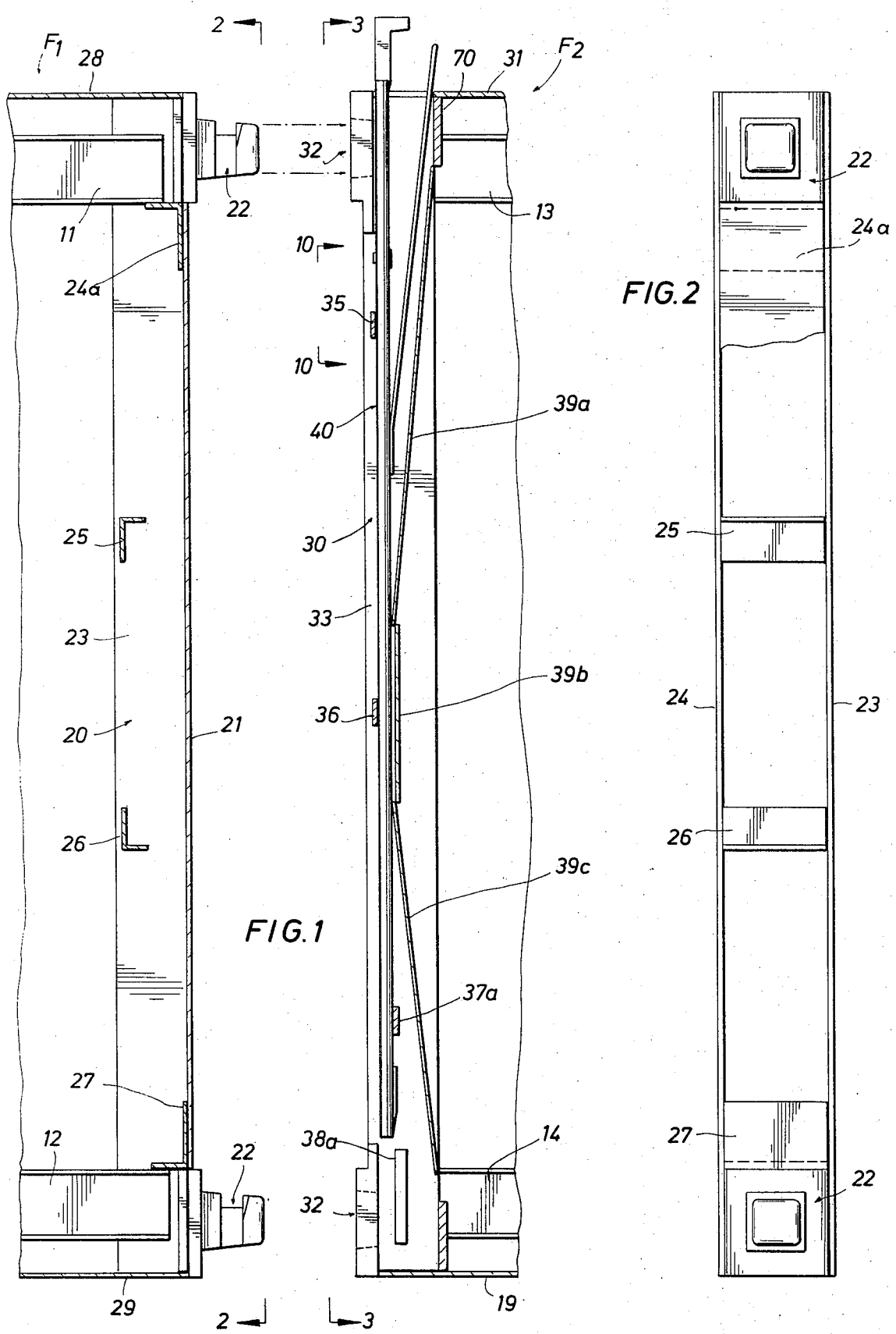

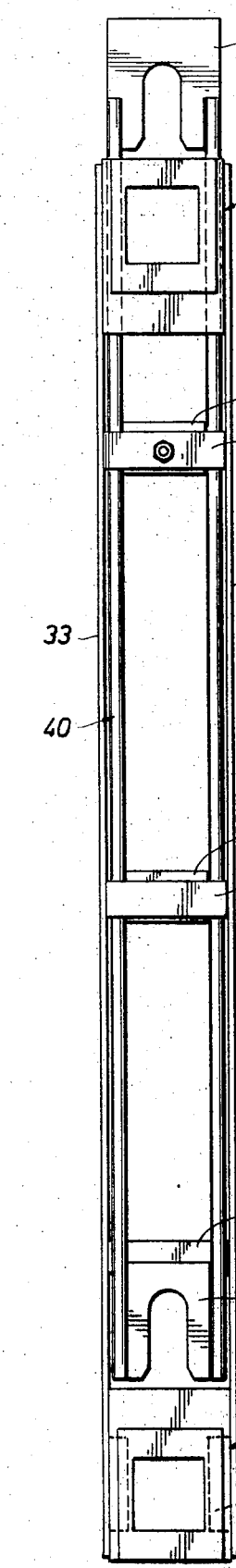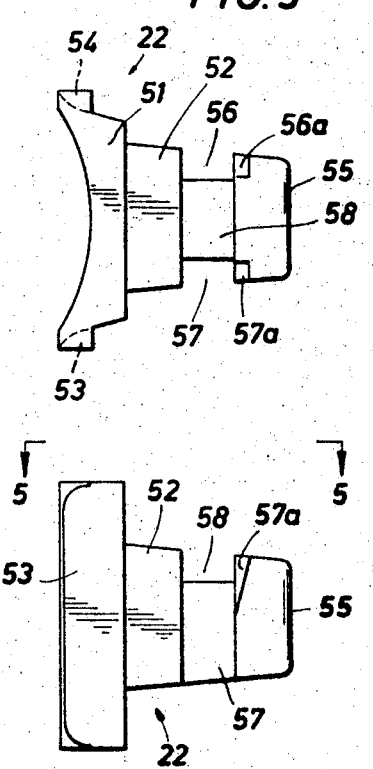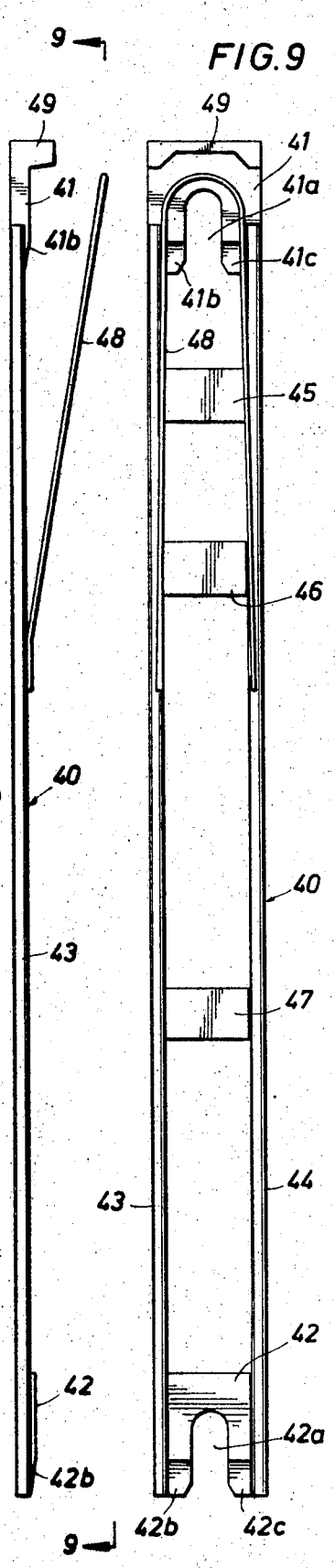

FLOAT CONNECTION APPARATUS

BACKGROUND OF THE INVENTION

1. Field of Invention

The present invention relates to floats adapted to serve as supports, means of transportation, work platforms and the like on water and various combinations of such floats which may be used as barges, pontoon bridges, ferrys, work platforms and the like. In particular the present invention concerns apparatus suitable for releasably connecting two or more of such floats in combinations suitable for the particular purpose desired.

2. Brief Description of the Prior Art

Standard water-tight buoyant float sections or units are known in the prior art which are suitable for connection with each other to form various assemblies for particular uses. For example, standardized units have been developed which are suitable for connection to form barges, pontoon bridges, ferrys, work platforms and the like. The advantages of such units are well known and include portability, flexibility and versatility in applications for marine, inshore marine and overland operations.

One of the most difficult problems with such units is the provision of suitable means of connection between adjacent units. A connection must be provided for locking two or more units together which is simple to assemble and disassemble, yet offers the strength necessary to meet the stresses encountered in the various uses in which the units may be employed. One such means of connection is shown in my U. S. Pat. No. 3,057,315. In such a system, a float section is provided with pins along one side thereof and sockets along the opposite side thereof. The pins are provided with enlarged heads and are shaped to mate with and loosely fit within identical sockets on an adjacent float unit and may be provided with enlarged heads which are adapted to extend through the sockets. A locking assembly is associated with the sockets and is provided with open-ended slots to receive the pins of the adjacent float unit inboard of the pin heads and smaller than the pin heads to lock the pins in the sockets. The locking assembly is mounted in a guideway associated with the sockets and movable from a first position clear of the pins to a second position between the heads of the pins and the sockets. The pins and sockets of each float unit are correspondingly positioned and spaced on the float whereby the pins are engageable with the sockets on another identical float and the sockets will receive the pins of still another float.

The pins and sockets of the system described in the aforementioned U. S. Pat. No. 3,057,315 are of circular cross-section. Since there must be some tolerance between the pins and sockets for ease of assembly, the pin diameter is necessarily somewhat less than the socket diameter. Thus bearing loads are taken by two rounded surfaces of unequal diameter. This results in more wear to the surfaces than is desired. Furthermore, the cross-sectional area of the pin behind the pin head limits the shear load taken by the connection. In addition, relatively close manufacturing tolerances are required to permit assembly of the pins and sockets.

Furthermore, the hold-down apparatus of the locking assembly of the prior system is of the friction type. Although it does not occur too frequently, occasionally such a hold-down design allows the locking assembly to work out of its locking position so that premature separation of the float units may occur. In addition, the locking assembly of the aforementioned system is provided with a friction brake mechanism which allows the locking assembly to be temporarily maintained in various positions prior to movement to its locking position. However such a mechanism requires frequent adjustment to assure positive control at all positions.

SUMMARY OF THE INVENTION

The present invention is an improvement in the pin and socket connection apparatus described in U. S. Pat. No. 3,057,315. Like the prior system, the present system includes socket and pin assemblies, carried by each of the float sections, and locking assemblies movable from a first position, permitting free movement of pin members into and out of socket apertures, to a second position locking the pin members in the socket apertures. However, unlike the prior system, the pin members and socket apertures of the present invention are rectangular in cross-section. In fact, in a preferred embodiment, the cross-sections are square shaped. Such a design increases the strength of the connection by providing greater cross-section areas for tension and shear loads without appreciably increasing the weight and dimensions. It also provides an increased area for bearing loads imposed at the contact points between the pins and socket apertures, thereby increasing the useful life of the parts and eliminating the wear that occurs in the prior system when two rounded surfaces of unequal diameter contact each other under load. Furthermore, the square shape provides greater contact between the locking assembly and the pin when the pins are locked in the sockets.

In addition the walls of the socket apertures and the mating external surfaces of the pin of the improved system are longitudinally tapered to provide a close surrounding tapered fit. Such a tapered fit permits design construction and operation under greatly reduced tolerances without reducing the ease of assembly. These reduced tolerances in turn decrease the likelihood of fatigue failure due to impact loads that occur when the system is used under forces imposed by wave action and moving loads.

A new and improved hold-down mechanism is also disclosed for holding the locking assembly in the second or locked position. Such a design has completely eliminated the problem of the locking assembly working up or being disengaged under live loading. In addition, an improved friction mechanism is disclosed which provides positive control of the locking assembly at all positions without the frequent adjustments required in the prior system.

Several other improvements are made in the present system, including special welded bevels to assure full strength connection between welded parts. Other improved structural designs are disclosed which increase the overall strength of the entire connection apparatus without appreciably increasing weight and without affecting the uniformity of the standardized assembly. Many other objects and advantages of the invention will become apparent from the description which follows when read in conjunction with the accompanying drawings.

BRIEF DESCRIPTION OF THE DRAWINGS

In the drawings:

FIG. 1 is a fragmentary view, in vertical cross-section, through the side walls and the connection assemblies of two adjacent floats in position for connection with each other just prior to such connection, according to a preferred embodiment of the invention.

FIG. 2 is a vertical front elevation view of the pin assembly for releasably connecting a pair of float sections, taken along line 2—2 of FIG. 1;

FIG. 3 is a vertical front elevation view of a socket assembly and an associated locking assembly for releasably connecting a pair of float sections, showing the lock assembly in an upper or unlocked position, taken along line 3—3 of FIG. 1, the locking assembly bieng shown in a slightly higher position than in FIG. 1;

FIG. 4 is a detailed side elevation view of a pin member casting identical with the pin members making up a part of the pin assembly shown in FIGS. 1 and 2;

FIG. 5 is a detailed top plan view of the pin member casting of FIG. 4;

FIG. 6 is a side elevation view of a socket member casting identical to the socket members employed in the socket assembly shown in FIGS. 1 and 3;

FIG. 7 is a top plan view of the socket member casting of FIG. 6;

FIG. 8 is a side elevation view of the locking assembly associated with the socket assembly of FIGS. 1 and 3;

FIG. 9 is a rear elevation view of the locking assembly;

DESCRIPTION OF A PREFERRED EMBODIMENT

Figure 10:
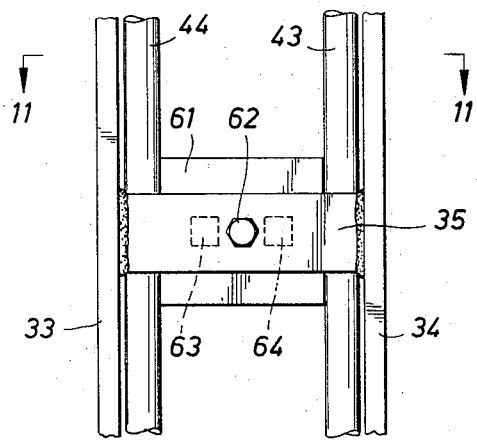
FIG. 10, taken along line 10—10 of FIG. 1, is a detailed elevation view illustrating the friction mounting between the socket assembly and the locking assembly.

The present invention is directed to improved connection apparatus for joining floats together so as to provide a greater variety of uses. Although the invention may be used with many types of floats and barges, it is contemplated that it will be used primarily with the type of floats disclosed in U. S. Pat. No. 3,057,315. Such floats are constructed of structural framework which comprise intersecting longitudinal and transverse trusses. The struts of the trusses are so connected to the truss chords that when they transmit a thrust or pull upon a chord, the chord is loaded with a beam type of loading. Advantage is taken of the flexible nature of the material of the chord to permit the truss as a whole to flex and yield under loads. Such construction is physically flexible, light weight and not susceptible of taking a permanent set due to distortion and rough useage. Further details of the construction of such a float may be seen in the aforementioned U. S. Pat. No. 3,057,315.

Referring first to FIGS. 1–3, the improved apparatus for releasably connecting a pair of float sections will be generally described. In FIG. 1 the sides of a pair of float sections, $F_1$ and $F_2$, are shown drawn up close to each other as they might appear prior to connection. However, as previously explained, it has been found that the intersecting longitudinal and transverse construction described in U. S. Pat. No. 3,057,315 is particularly desirable. Assuming that the floats, $F_1$ and $F_2$, are constructed in this manner, there is shown a pair of upper and lower structural members 11, 12, 13, 14, which may represent the upper and lower chords of one of the transverse trusses of which the floats are constructed. Welded to one end of chords 11 and 12 is a pin assembly 20 which forms a portion of the connecting apparatus of the invention. The pin assembly 20 may also serve as the end member of the transverse truss whose chords are 11 and 12. Connected to one end of chords 13 and 14 of float $F_2$ is a socket assembly 30 which forms a portion of the connecting apparatus of the invention. The socket assembly 30 may also serve as an end member for the transverse truss which includes chords 13 and 14. Carried in a vertical guideway within socket assembly 30 is a locking assembly 40, which is shown in a slightly elevated position. In fact, in FIG. 3 the locking assembly 40 is shown in a higher position than would normally be possible, so as to better show some of its parts. At the opposite end (not shown) of the truss for float $F_1$ is a socket and locking assembly similar to assemblies 30 and 40 of float $F_2$. At the opposite end (not shown) of the truss for float $F_2$, is a pin assembly similar to the assembly 20 of float $F_1$.

The pin assembly 20 may comprise a pair of vertically spaced pin members 22, welded between a pair of elongated vertical plates, 23, 24. Angle members 24a, 25, 26 and 27 may also be welded to each of the plates to provide greater strength to withstand torsional as well as vertical loading. It is, of course, understood that the float would have a covering material and such is represented by side sheet 21, upper sheet 28 and lower sheet 29. In most instances the sheets 21, 28, 29 are of a heavy gauge plate or sheet metal.

The pins 22 may be conveniently manufactured by a casting process and such a casting is shown in FIGS. 4 and 5. The pin member may comprise a pin block 51 and, of course, the pin 52 itself. The sides of the pin block may be provided with special bevels 53, 54 assuring full strength welded connection between the casting and the structural plates 23, 24 to which they are attached. The pin itself 52 is square in cross-section and tapers longitudinally from its base toward the front face 55 so that its cross-section diminishes from the base to the face 55. A pair of locking grooves 56, 57 are transversely disposed on opposite sides of the pin and may be connected at one end, the upper end in the present case, by an interconnecting groove 58. Each of the locking grooves 56 and 57 may be provided with an inclined surface 56a, 57a, the purpose of which will be more fully understood hereafter.

The socket assembly 30 may comprise a pair of vertically spaced socket members 32 which are also welded to a pair of elongated vertical structural plates 33 and 34. The structural plates 33 and 34 may also be connected by structural bars 35, 36 and 37a which are welded therebetween. The float $F_2$ is, of course, also provided with covering material such as upper sheet 31, lower sheet 19 and side sheets 39a, 39b and 39c. The structural side plates 33 and 34 and side covering sheets 39a, 39b and 39c form a channel or guideway in which the locking assembly 40 may slide between positions, as will be explained hereafter. Guide plates 38a are also provided for guiding the lower end of the locking assembly 40.

As with the pin members 22 of the pin assembly 20, the socket members 32 may be conveniently formed by casting. Details of such a casting are shown in FIGS. 6 and 7. The socket block 33a may also be provided with special bevels 34a and 35a along its sides to assure a full strength welded connection between these castings and the side plates 33, 34, to which they are attached. The casting is essentially rectangular in cross-section, the longest sides of which lie in the vertical direction when attached to the socket assembly 30. This provides additional weld area for supporting shear loads. The socket member 32 is, of course, provided with a socket aperture 37, the cross-sections of which are square shaped. The cross-sections may be rectangular and, of course, a square is a special rectangle. The sides 38 of the aperture 37 are longitudinally tapered inwardly forming a tapered hole which corresponds with the taper of the pins 22 near their bases.

The tapered aperture 37 is designed for mating with the pin members 22 and their interengagement will be more fully understood hereafter.

Welded to the upper end of side plates 33 and 34, is a hold-down member 70. As best seen in FIGS. 12-16, the hold-down member 70 comprises a back plate 71 at the upper end of which projects a pair of stop lugs 72, leaving a space 73 therebetween.

The locking assembly 40 may be best understood by reference to FIGS. 8 and 9. This assembly comprises a vertically spaced pair of locking wedges 41, 42, welded between and at opposite ends of a pair of elongated structural side bars 43 and 44. Lateral support bars 45, 46 and 47 may also be welded to the side bars. In addition to serving as structural support, some of these lateral bars may also serve as stops as will be more fully understood hereafter. Welded to each of the side bars 43 and 44 is a hairpin of "U" shaped spring bar 48. Spring bar 48 serves as a hold-down for the locking assembly 40 as will be more fully understood hereafter. For present purposes, it is sufficient to note that spring bar 48 is generally biased in a direction away from the upper wedge member 41.

Upper and lower wedge members 41 and 42 are similar and include an open-ended elongated slot 41a, 42a. Each wedge member is provided at opposite sides of the slots with tapered or inclined surfaces 41b, 41c, 42b, 42c, the purposes of which will be more fully understood hereafter. The upper end of the upper wedge member 41 may also be provided with a transverse lip or flange portion 49, the purpose of which will also be more fully understood hereafter.

Figure 11:
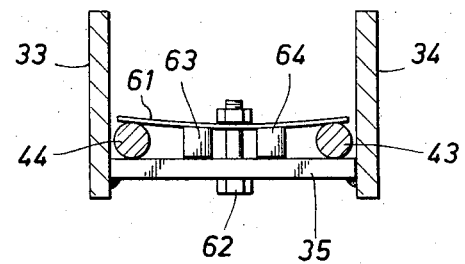
FIG. 11 is a cross-sectional detail, taken along lines 11—11, of the friction mounting of FIG. 10.
Figure 16:
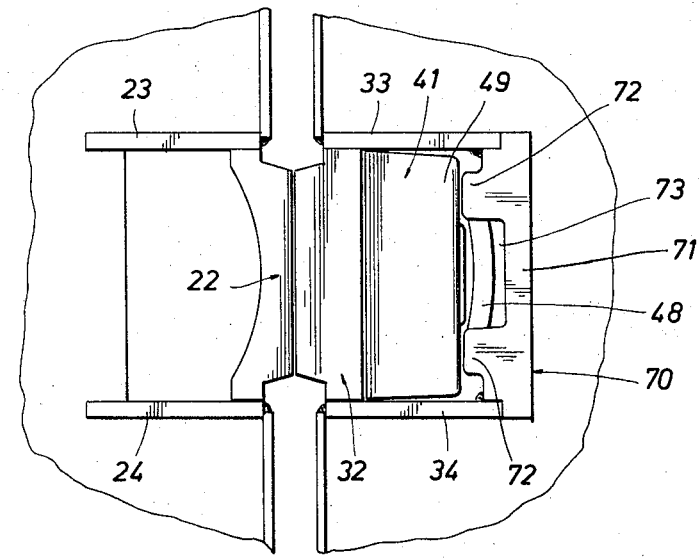
FIGS. 12—16 are step-by-step illustrations of the upper end of the pin, socket and locking assemblies of the invention, showing the movement of the respective assemblies from initial engagement to the final locked position.

As shown in FIG. 1, th locking assembly 40 is received within the socket assembly 30 for vertical movement in the guideway formed thereby. A friction brake may be provided so that the locking assembly can be temporarily maintained at any position along its limited vertical travel. The friction brake mechanism may be attached to the cross bar 35 and such a mechanism is shown in detail in FIGS. 10 and 11. It may include a leaf or plate type spring 61 attached to the cross bar 35 by a nut and bolt 62. Spacing blocks 63 and 64 may be provided for assuring the proper spacing. The ends of the spring 61 frictionally engage the side bars 43 and 44 of locking assembly 40 so that no matter what position the locking assembly assumes, that position may be temporarily maintained.

Referring now to FIGS. 12-16, the bringing together in full engagement and locking of the pin and socket assemblies of the connection will be described in detail. Only the upper portions of the pin, socket and locking assemblies will be shown, it being understood that the lower portions of these assemblies operate in substantially an identical manner.

Figure 12:
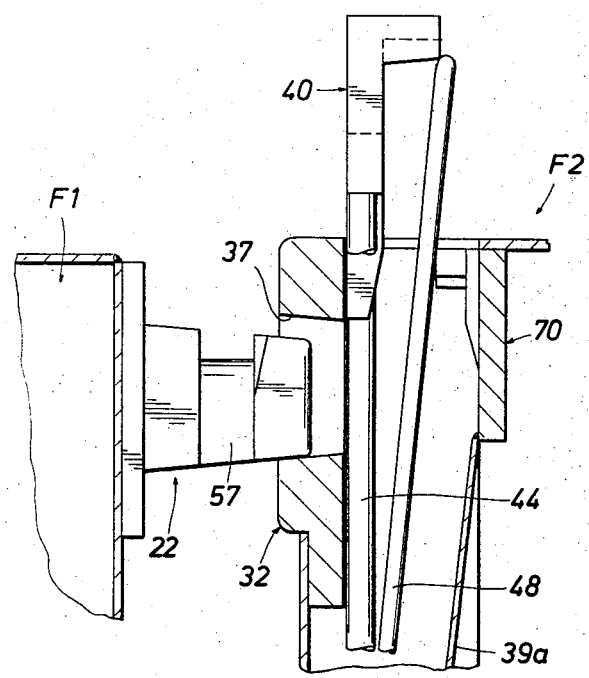

As the sides of the float $F_1$ and $F_2$ are first brought together, the pin 22 engages the socket member 32 as shown in FIG. 12. Since the pin member 22 and the socket aperture 37 are tapered, a maximum clearance is provided at initial entry allowing for some misalignment between the respective assemblies. The locking assembly 40 is held in the up position by the friction mechanism described with reference to FIGS. 10 and 11 and does not interfere with free entry of the pin member 22 into the socket aperture 37.

Figure 13:
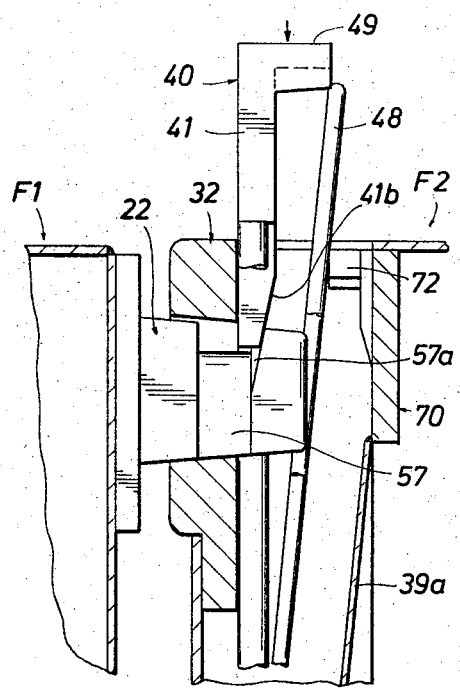
Figure 14:
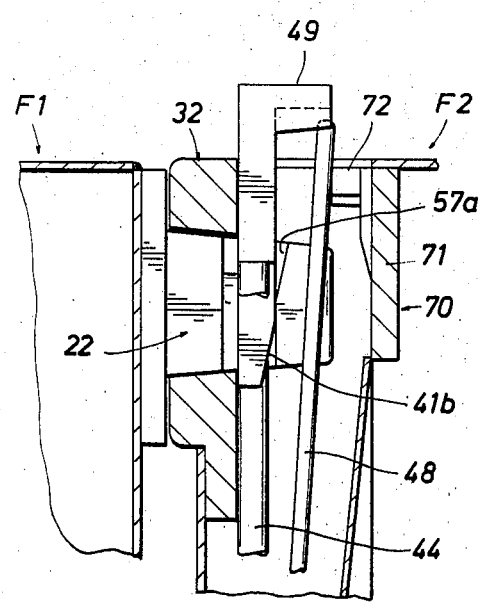

The pin member 22 further penetrates socket aperture 37 until it generally assumes the position shown in FIG. 13. At this point, a force may be applied to the upper end of the locking assembly 40, as indicated by the arrow in FIG. 13, causing the wedge surfaces 41b and 41c to engage the inclined surfaces 56a, 57a of locking grooves 56 and 57 of the pin member 22. The force may be applied by any suitable means, for example, hitting the lip 49 with a sledge hammer. As the wedge member 41 is driven downwardly, the float sections $F_1$ and $F_2$ are pulled together until the pin member 22 fully engages socket member 32 as shown in FIG. 14. As the locking assembly is forced downwardly, the spring bar 48 is cammed inwardly as shown in FIG. 14 by the stop lugs 72 on the hold-down member 70.

Continued force is applied to the locking assembly 40 until the upper end of wedge member 41 is flush with the upper covering sheets 28 and 31 of floats $F_1$ and $F_2$. At this point the spring bar 48 reaches a point where it is allowed to spring outwardly underneath the hold-down lugs 72. The pin 22 is now fully engaged with the socket 32 and the locking assembly 40 is fully secured by the action of the spring bar 48. The spring bar 49 is locked below the lugs 72 preventing the locking assembly from moving up until the spring bar 48 is released from the hold-down casting.

Figure 15:
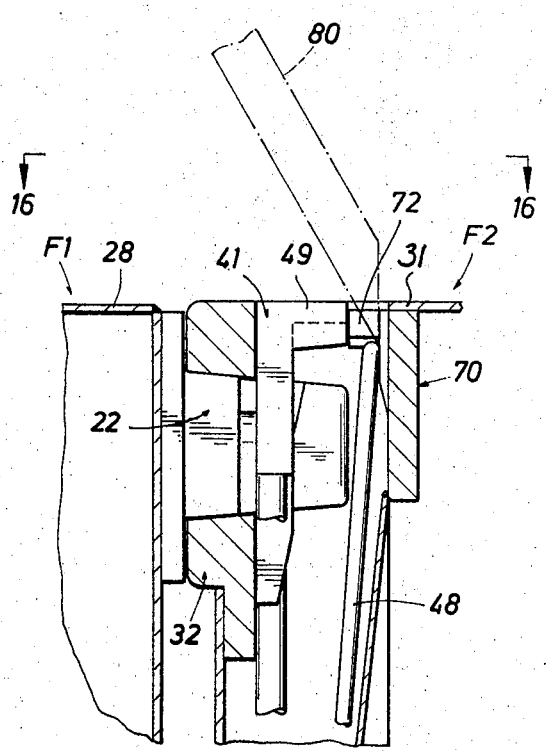

When it is desired to release the connection, a standard pinch bar 80 as shown in FIG. 15 may be inserted in the space 73 (See FIG. 16) between lugs 72 engaging the upper end of spring bar 48. By prying the spring bar away from the hold-down lugs, the upper end of the spring may be displaced from underneath the lugs and the locking assembly raised enough to prevent the spring bar 48 from springing back underneath the lugs 72. Then the locking assembly 40 may be pulled upwardly to the non-engaging or free position of FIG. 12. As previously stated, the cross bars 45 and 46 of the locking assembly 40 (See FIG. 9) may also serve as stops limiting the vertical travel of the locking assembly. One of these bars, depending upon the direction of travel, will contact the cross bar 35 of the socket assembly at the opposite extremes of vertical travel.

As can be seen from the foregoing description, the present invention provides an improved connection which has increased strength by providing greater cross-sectional areas for tension and shear loads. It also provides increased areas for bearing loads imposed at the contact between the pin and socket members increasing the useful life of the pin and socket castings. Such improved characteristics are made possible by the tapered square pin and socket apertures.

The tapered construction of the pin and socket aperture also permits design, construction and operation under greatly reduced tolerances without reducing the ease of assembly. Such reduced tolerances also reduce the likelihood of failure from fatigue due to impact loads that occur when the system is under forces imposed by wave action and moving loads.

The locking or hold-down features of the present invention are also definite improvements over the prior art. The locking provided is positive and assures that the locking wedges are not prematurely displaced, releasing the connection. Yet the connection can be released quickly and in a simple manner. Furthermore, it does not require frequent adjustment as in prior systems. Many other structural improvements are provided in the improved connection system.

Although only one embodiment of the present invention has been described herein, many other variations and adaptations has been described herein, many other variations and adaptations thereof can be made without departing from the spirit of the invention. It is therefore intended that the scope of the invention be limited only by the claims which follow.

I claim:

1. Apparatus for releasably connecting a pair of floats comprising:
   a. socket means carried by one of said float sections and including at least one aperture having rectangular cross-sections and wherein the walls of said aperture are longitudinally tapered inwardly;
   b. pin means carried by the other of said floats and including a pin member having rectangular cross-sections similar to the cross-sections of said aperture, telescopically engageable with said aperture, and having its external longitudinal surfaces correspondingly tapered to provide a close surrounding tapered fit between said aperture and said pin member; and
   c. locking means movable from a first position, permitting free movement of said pin member into and out of said aperture, to a second position locking said pin member in said close surrounding tapered fit with said aperture.

2. Apparatus as set forth in claim 1 in which the sides of said rectangular cross-sections are substantially equal, forming a square.

3. Apparatus as set forth in claim 1 in which said locking means is provided with releasable hold-down means by which said locking means is automatically locked in said second position.

4. Apparatus as set forth in claim 3 in which said locking means is provided with friction means for temporarily maintaining said locking means in said first position.

5. Apparatus as set forth in claim 1 in which said pin member is provided with a pair of transversely disposed locking grooves on opposite sides of said pin member, said locking means including wedge means engageable with said pair of locking grooves when in said second position to lock said pin within said aperture.

6. Apparatus as set forth in claim 5 in which at least one end of said locking grooves is provided with an inclined surface engageable by said wedge means to force said pin member into said close surrounding fit with said aperture.

7. Apparatus as set forth in claim 5 in which said pin member is provided with at least one other transversely disposed locking groove on another side of said pin member communicating with said pair of locking grooves, said wedge means having an open-ended slot, the sides of which surround three sides of said pin member within said locking grooves when said locking means is in said second position.

8. Apparatus for releasably connecting a pair of floats comprising:
   a. socket means carried by one of said float sections and including at least one socket member having an aperture the walls of which are longitudinally and inwardly tapered;
   b. pin means carried by the other of said floats and including at least one pin member telescopically engageable with said aperture and correspondingly tapered for a close surrounding tapered fit therewith; and
   c. locking means movable from a first position, permitting free movment of said pin member into and out of said aperture, to a second position locking said pin member in said close surrounding tapered fit with said aperture.

9. Apparatus as set forth in claim 8 in which the transverse cross-sections of said aperture and pin member are square shaped.

10. Apparatus as set forth in claim 8 in which said pin member is provided with a pair of vertical locking grooves on opposite sides of said pin member, said locking means including a wedge member engageable with said pair of locking grooves to draw said pim member into said close surrounding tapered fit with said aperture.

11. Apparatus as set forth in claim 10 in which said locking means include hold-down means automatically operable on movement of said locking means to said second position to lock said locking means in said second position.

12. Apparatus for releasably connecting a pair of floats comprising:
   a. socket means carried by one of said float sections and including at least one socket member having an aperture the walls of which are longitudinally and inwardly tapered;
   b. pin means carried by the other of said floats and including at least one pin member telescopically engageable with said aperture and correspondingly tapered for a close surrounding tapered fit therewith, said pin member being provided with a pair of verticla locking grooves on opposite sides of said pin member;
   c. locking means movable from a first position, permitting free movement of said pin member into and out of said aperture, to a second position locking said pin member in said close surrounding tapered fit with said aperture, said locking means including a wedge member engageable with said pair of locking grooves to draw said pin member into said close surrounding tapered fit with said aperture; and d. hold-down means comprising spring means, connected to and movable with said wedge means, and stop means fixed relative to one of said floats, said spring means being biased toward engagement with said stop means when said locking means is in said second position.

13. Apparatus as set forth in claim 12 in which said wedge member is carried on said one of said float sections in a guideway for limited vertical movement between said first and second positions.

14. Apparatus as set forth in claim 13 characterized by friction means engaging said locking means for temporarily maintaining said locking means in any vertical position between said first and second positions.

15. Apparatus for releasably connecting a pair of floats comprising:
   a. socket means carried by one of said floats and including a socket member having an aperture;
   b. pin means carried by the other of said floats and including a pin member telescopically engageable with the aperture of said socket member and having corresponding cross-sections for a close surrounding fit therewith; and
   c. locking means carried by said other of said floats including a wedge member movable from a first position to a second position engaging said pin member locking said pin member in said close surrounding fit with said aperture, said locking means including spring biased means automatically engageable with a stop lug affixed to said one of said floats when said locking means is in said second position to releasably hold said locking means in said second position.

16. Apparatus as set forth in claim 15 including two of said socket members connected to each other by structural members, two of said pin members connected to each other by structural members, and two of said wedge means connected to each other by structural members.

17. Apparatus as set forth in claim 16 in which said locking means is vertically movable between said first and second positions in a guideway at least partially defined by the structural members connecting said socket members.

18. Apparatus as set forth in claim 17 in which each of said pin members are provided with a pair of vertical locking grooves on opposite sides of said pin members, said wedge members including an open-ended slot, the sides of which engage said locking grooves when in said second position.

19. Apparatus as set forth in claim 15 in which the sides of said apertures and said pin members are correspondingly tapered in a longitudinal direction whereby said pin members and apertures may be forced into said close surrounding fits when not in perfect alignment.

20. Apparatus for releasably connecting a pair of floats comprising:
   a. socket means carried by one of said floats and including a pair of vertically spaced socket members having an aperture, the cross-sections of which are square, said socket members being connected to each other by structural members;
   b. pin means carried by the other of said floats, and including a pair of vertically spaced pin members telescopically engageable with the apertures of said socket members and having corresponding square shaped cross-sections for close surrounding fits therewith; and
   c. locking means carried by said other of said floats including a pair of vertically spaced wedge members connected to each other by structural members and vertically movable in a guideway, at least partially defined by the structural members connecting said socket members, from a first position to a second position engaging corresponding ones of said pin members locking said pin members in said close surrounding fits with said apertures, said locking means including spring biased means automatically engageable with a stop lug affixed to said one of said floats when said locking means is in said second position to releasably hold said locking means in said second position.

21. Apparatus as set forth in claim 20 in which said spring biased means includes a "U" shaped spring bar which is engageable by manipulation means to release said locking means for movement away from said second position.

* * * * *